US012783320B2

(12) United States Patent
Mulpuri et al.

(10) Patent No.: US 12,783,320 B2
(45) Date of Patent: Nov. 3, 2026

(54) FORECASTING OF RESOURCE REQUIREMENTS FOR COMPONENTS OF SOFTWARE APPLICATIONS

(71) Applicant: Healtech Software India Pvt. Ltd., Bangalore (IN)

(72) Inventors: Raja Shekhar Mulpuri, Bangalore (IN); Atri Mandal, Bangalore (IN); Palavali Shravan Kumar Reddy, Bangalore (IN); Jaisri S, Bangalore (IN); Adityam Ghosh, Bangalore (IN)

(73) Assignee: Healtech Software India Pvt. Ltd, Bangalore (IN)

( * ) Notice: Subject to any disclaimer, the term of this patent is extended or adjusted under 35 U.S.C. 154(b) by 398 days.

(21) Appl. No.: 18/062,033

(22) Filed: Dec. 6, 2022

(65) Prior Publication Data

US 2023/0176920 A1 Jun. 8, 2023

(30) Foreign Application Priority Data

Dec. 7, 2021 (IN) ............................ 202141056785

(51) Int. Cl.
*G06F 9/50* (2006.01)

(52) U.S. Cl.
CPC .......... *G06F 9/5055* (2013.01); *G06F 9/5038* (2013.01); *G06F 2209/5019* (2013.01)

(58) Field of Classification Search
CPC ................. G06F 9/5055; G06F 9/5038; G06F 2209/5019; G06F 2209/508
See application file for complete search history.

(56) References Cited

U.S. PATENT DOCUMENTS

2015/0310139 A1* 10/2015 Desikachari ..... G06Q 10/06315 703/2
2017/0261949 A1* 9/2017 Hoffmann ................ G06N 7/01
2020/0364809 A1* 11/2020 Lee ......................... G06Q 10/02
2021/0133670 A1* 5/2021 Cella ....................... G06Q 10/10
2022/0245485 A1* 8/2022 Cady ......................... G06N 5/04
2022/0300344 A1* 9/2022 MacDonald .............. G06F 8/60
2023/0153165 A1* 5/2023 Higginson .......... G06F 11/3006 718/104

* cited by examiner

*Primary Examiner* — Christopher B Robinson
*Assistant Examiner* — Tania M Pena-Santana
(74) *Attorney, Agent, or Firm* — IPHORIZONS PLLC; Narendra Reddy Thappeta

(57) ABSTRACT

An aspect of the present disclosure is directed to forecasting resource requirements for components of software applications. In one embodiment, a system constructs a component graph of components deployed in a computing environment, the component graph indicating for each component, a corresponding subset of components that are invoked by the component and a corresponding distribution of component workloads received at the component to the subset of components. Upon receiving data indicating an entry workload expected to be received in a future duration at one or more entry components, the system estimates by traversing the component graph, a component workload, corresponding to the entry workload, expected to be received in the future duration at a first component and determines resource requirements for the first component based on the estimated component workload.

22 Claims, 14 Drawing Sheets

610

| Time | Txn_Search_Flight_AvgRespTime | Txn_Select_Flight_Total | Txn_Search_Hotel_AvgRespTime | Txn_Select_Hotel_ Total | ... | Txn_Booking_AvgRespTime | Txn_Booking_Total | ... |
|---|---|---|---|---|---|---|---|---|
| 1/12/2016 0:01 | - | - | 34.3935 | 1.51033 | ... | 11 | 2 | ... |
| 1/12/2016 0:02 | 3.068 | 2 | 24.3418 | 1.739 | ... | 68 | 13 | ... |
| 1/12/2016 0:03 | 1.792 | 1 | 38.405 | 4.926 | ... | 505 | 86 | ... |
| 1/12/2016 0:04 | - | - | - | 3.54267 | ... | 1,977 | 383 | ... |
| 1/12/2016 0:05 | - | - | - | 186.418 | ... | 2,533 | 724 | ... |
| ⋮ | ⋮ | ⋮ | ⋮ | ⋮ | ⋮ | ⋮ | ⋮ | ⋮ |
| 1/12/2016 0:23 | - | - | 27.6421 | 1.025 | ... | 4,977 | 383 | ... |
| 1/12/2016 0:24 | 33.102 | 1 | 27.0773 | 7.339 | ... | 17,533 | 724 | ... |

FIG. 6A

620

| Workload ID | Txn_Search_ Flight | Txn_Select_ Flight | Txn_Search_ Hotel | Txn_Select_ Hotel | Txn_Booking | Txn_Payment |
|---|---|---|---|---|---|---|
| EW1 | 2 | 0 | 9 | 6 | 11 | 2 |
| EW2 | 4 | 3 | 16 | 14 | 68 | 3 |
| EW3 | 29 | 12 | 155 | 51 | 505 | 14 |
| EW4 | 152 | 32 | 689 | 203 | 4,977 | 136 |
| EW5 | 1,022 | 247 | 5,206 | 373 | 17,533 | 1,086 |

FIG. 6B

630

Component C9

| Workload ID | Txn_Search_Flight | Txn_Select_Flight | Txn_Search_Hotel | Txn_Select_Hotel | Txn_Booking | Txn_Payment |
|---|---|---|---|---|---|---|
| CW1 | 2 (1, 1, 0) | 0 (0, 0, 0) | 8 (4, 2, 2) | 7 (3, 4, 0) | 10 (5, 4, 1) | 1 (1, 0, 0) |
| CW2 | 4 (1, 1, 2) | 3 (1, 0, 2) | 16 (7, 5, 4) | 14 (4, 4, 6) | 65 (25, 30, 10) | 2 (1, 1, 0) |
| CW3 | 28 (8, 9, 11) | 11 (5, 5, 1) | 155 (45, 105, 20) | 51 (20, 15, 16) | 499 (200, 195, 150) | 11 (5, 4, 2) |
| CW4 | 140 (70, 35, 35) | 29 (10, 12, 7) | 685 (230, 250, 205) | 203 (83, 60, 60) | 4,867 (1622, 1753, 1492) | 132 (45, 45, 42) |
| CW5 | 1,010 (337, 495, 300) | 250 (100, 75, 75) | 5,108 (1702,1860, 1546) | 373 (125, 160, 88) | 17,435 (5811, 6500, 5124) | 989 (340, 355, 294) |

FIG. 6C

670

| Edge | Txn_Search_Flight | Txn_Select_Flight | Txn_Select_Flight | ... |
|---|---|---|---|---|
| E1 -> C1 | 1.0 | 0.0 | 1.0 | ... |
| C1 -> C6 | 0.5 | 0.0 | 0.7 | ... |
| C1 -> C9 | 1.0 | 1.8 | 1.4 | ... |
| C2 -> C7 | 1.5 | 1.0 | 0.0 | ... |
| ... | ... | ... | ... | ... |
| E2 -> C4 | 0.0 | 1.0 | 0.0 | ... |
| E2 -> C2 | 1.0 | 1.7 | 1.3 | ... |
| C4 -> C8 | 0.8 | 0.0 | 0.9 | ... |
| ... | ... | ... | ... | ... |
| E3 -> C5 | 1.0 | 1.7 | 1.3 | ... |
| C5 -> C10 | 0.8 | 0.0 | 0.9 | ... |
| ... | ... | ... | ... | ... |

680

| Edge | Txn_Search_Flight | Txn_Select_Flight | Txn_Select_Flight | ... |
|---|---|---|---|---|
| E1 -> C1 | 1.0 | 0.0 | 1.0 | ... |
| C1 -> C6 | 0.4 | 0.0 | 0.8 | ... |
| C1 -> C9 | 1.1 | 1.6 | 1.5 | ... |
| C2 -> C7 | 1.3 | 1.2 | 0.5 | ... |
| ... | ... | ... | ... | ... |
| E2 -> C4 | 0.0 | 0.9 | 0.0 | ... |
| E2 -> C2 | 1.0 | 1.2 | 0.0 | ... |
| C4 -> C8 | 0.6 | 0.0 | 1.9 | ... |
| ... | ... | ... | ... | ... |
| E3 -> C5 | 0.0 | 1.6 | 1.0 | ... |
| C5 -> C10 | 0.9 | 1.0 | 0.9 | ... |
| ... | ... | ... | ... | ... |

FIG. 6D

780

Component C9

| Time | CPU_UTIL | DISK_IOREAD | DISK_IOWRITE | EC_CPU_UTIL | ... | CURRENT_OPEN_CURSORS | LOCKS_WAITS | ... |
|---|---|---|---|---|---|---|---|---|
| 1/12/2016 0:01 | 28.8571 | 141.36 | 971.1 | 21.51033 | ... | 59810 | 0 | ... |
| 1/12/2016 0:02 | 13.068 | 212.2 | 24.3418 | 31.739 | ... | 59873 | 2 | ... |
| 1/12/2016 0:03 | 16.792 | 112.5 | 38.405 | 54.926 | ... | 60772 | 0 | ... |
| 1/12/2016 0:04 | 24.55 | 45.55 | 235.35 | 63.54267 | ... | 61374 | 10 | ... |
| 1/12/2016 0:05 | | 564.5 | 153.8 | 86.418 | ... | 61771 | 19 | ... |
| ⋮ | ⋮ | ⋮ | ⋮ | ⋮ | ⋮ | ⋮ | ⋮ | ⋮ |
| 1/12/2016 0:23 | 17.49 | 5025.5 | 92.6421 | 91.025 | ... | 61798 | 16 | ... |
| 1/12/2016 0:24 | 33.102 | 602.54 | 87.0773 | 70.339 | ... | 61811 | 85 | ... |

FIG. 7B

FORECASTING OF RESOURCE REQUIREMENTS FOR COMPONENTS OF SOFTWARE APPLICATIONS

PRIORITY CLAIM

The instant patent application is related to and claims priority from the co-pending India provisional patent application entitled, "FORECASTING OF CAPACITY REQUIREMENTS FOR MUCH LARGER NUMBER OF TRANSACTIONS THAN AVAILABLE IN HISTORICAL DATA", Serial No.: 202141056785, Filed: 7 Dec. 2021, which is incorporated in its entirety herewith.

BACKGROUND OF THE DISCLOSURE

Technical Field

The present disclosure relates to computing infrastructures and more specifically to forecasting of resource requirements for components of software applications.

Related Art

A software application is generally constituted of software instructions which are executed on computing infrastructures. In general, each software application is architected in the form of (software) components, with each component being designed to be invoked by other components by suitable interfaces. As used herein, a component is in the form of a software module (containing software instructions), which can be executed independently and invoked for providing a specific functionality.

Resources of the computing infrastructures are commonly required for execution of the software applications (or components thereof). Examples of resources may be hardware resources such as memory (RAM), CPU (central processing unit) cycles, persistent storage, etc. or application resources such as database connections, application threads, etc. The limited resources are typically allocated to software applications/components prior to execution, and are thereafter used during the execution of software applications/components. Such allocated resources cannot be shared with other applications/components at least during their usage.

According there is a general need to determine the resource requirements for components of software applications prior to their allocation. Aspects of the present disclosure are directed to forecasting of resource requirements for components of software applications.

BRIEF DESCRIPTION OF THE DRAWINGS

Example embodiments of the present disclosure will be described with reference to the accompanying drawings briefly described below.

FIG. 6A is a real-time transaction table depicting metrics captured for various transactions that have occurred in a block duration during the operation of a software application, in one embodiment.

FIG. 6B is an entry workload table depicting the entry workloads identified for a software application in one embodiment.

FIG. 6C is a component workload table depicting the component workloads identified for a component in one embodiment.

FIG. 6D depicts a branch probability table annotated based on processing of different entry workloads in one embodiment.

FIG. 7B is a resource table depicting the usage of the resources by components of a software application deployed in a computing infrastructure in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
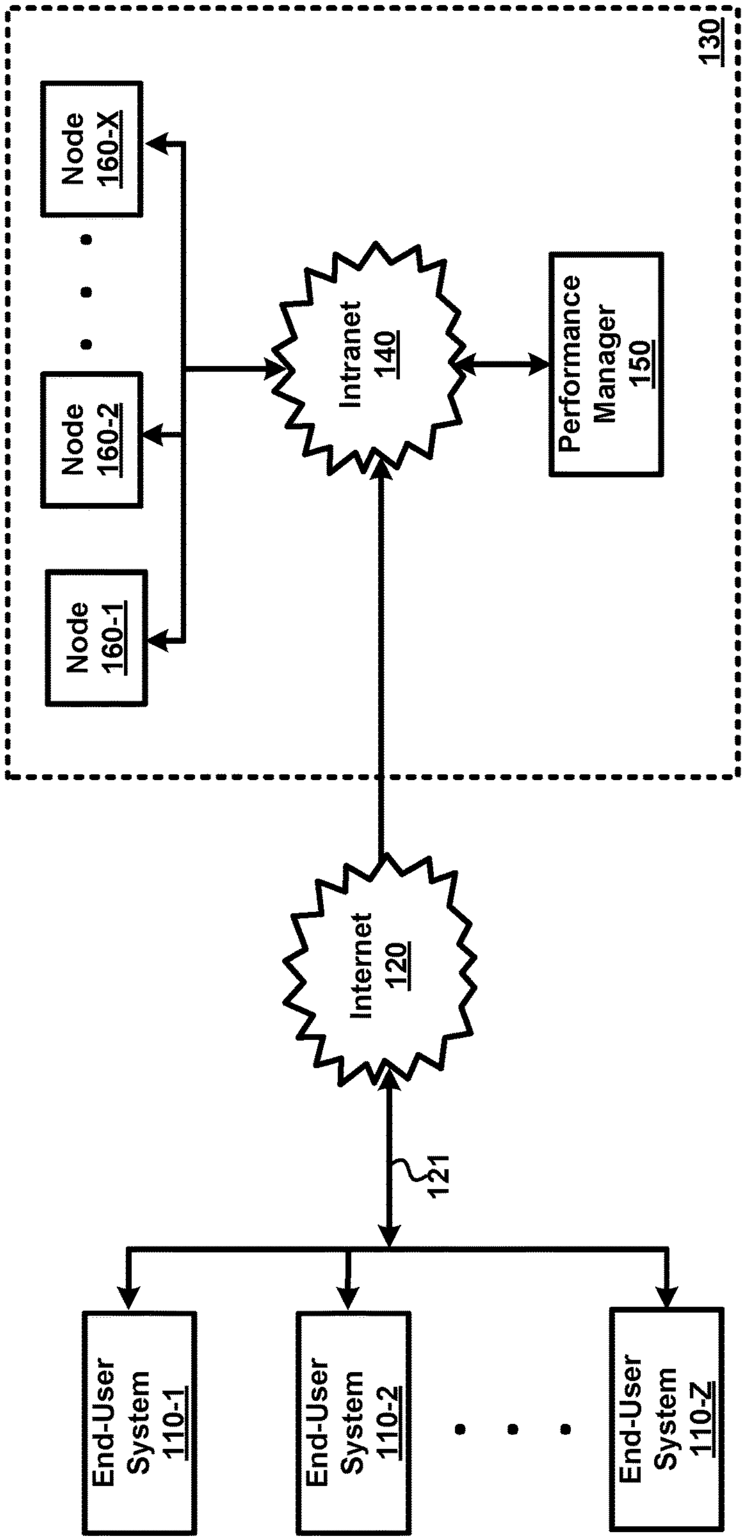
FIG. 1 is a block diagram illustrating an example environment (computing system) in which several aspects of the present invention can be implemented.

An aspect of the present disclosure is directed to forecasting resource requirements for components of software applications. In one embodiment, a system constructs a component graph of components deployed in a computing environment, the component graph indicating for each component, a corresponding subset of components that are invoked by the component and a corresponding distribution of component workloads received at the component to the subset of components. Upon receiving data indicating an entry workload expected to be received in a future duration at one or more entry components, the system estimates by traversing the component graph, a component workload, corresponding to the entry workload, expected to be received in the future duration at a first component and determines resource requirements for the first component based on the estimated component workload.

According to another aspect of the present disclosure, each of the component workload and the entry workload contains transactions of corresponding transaction types received in a corresponding duration, each workload indicating the corresponding transaction types and a respective number of occurrences of each transaction type in the corresponding duration.

According to one more aspect of the present disclosure, each edge in the component graph (noted above) is associated with a corresponding branch probability of a component in the edge invoking another component in the edge, the branch probabilities associated with the edges between a component and its subset of components representing the corresponding distribution. The system estimates the component workload by first identifying, by traversing the component graph, a first set of paths connecting the one or more entry components to the first component in the component graph, each path of the first set of paths containing a respective first set of edges. The system then computes the component workload for the first component based on the entry workload expected in the future duration and a respective set of branch probabilities associated with the identified respective first set of edges.

According to yet another aspect of the present disclosure, the system constructs the component graph by monitoring corresponding entry workloads received in one or more prior durations at the one or more entry components and processing each corresponding entry workload. The processing is performed by identifying an affected set of components invoked for processing the corresponding entry workload, determining a respective branch probability of each affected component to invoke each of a corresponding subset of affected components, and annotating respective edges in the component graph between the affected component and the corresponding subset of affected components to the respective branch probability.

According to an aspect of the present disclosure, the system determines the resource requirements by monitoring resource usage metrics associated with the first component while processing corresponding component workloads received in one or more prior durations at the first component, wherein each resource usage metric measures a corresponding resource used by the first component. The system generates a first capacity forecasting (CF) model for the first component that correlates the values of the resource usage metrics to the corresponding component workloads received in the one or more prior durations. The system predicts, using the first CF model, a first set of values for the resource usage metrics based on the component workload expected in the future duration, the first set of values representing the resource requirements of resources for the first component in the future duration.

According to yet another aspect of the present disclosure, the first CF model (noted above) is an ensemble of one or more machine learning (ML) models and one or more deep learning (DL) models. The one or more ML models includes a GAM (generative additive model) based model and a RERF (Regression-enhanced Random Forests) based model, while the one or more DL models includes a LSTM (Long short-term memory) based model. In one embodiment, the first CF model is a self-supervised learning model.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment (computing system) in which several aspects of the present invention can be implemented. The block diagram is shown containing end-user systems 110-1 through 110-Z (Z representing any natural number), Internet 120, and computing infrastructure 130. Computing infrastructure 130 in turn is shown containing intranet 140, nodes 160-1 through 160-X (X representing any natural number) and performance manager 150. The end-user systems and nodes are collectively referred to by 110 and 160 respectively.

Merely for illustration, only representative number/type of systems are shown in FIG. 1. Many environments often contain many more systems, both in number and type, depending on the purpose for which the environment is designed. Each block of FIG. 1 is described below in further detail.

Computing infrastructure 130 is a collection of nodes (160) that may include processing nodes, connectivity infrastructure, data storages, administration systems, etc., which are engineered to together host software applications. Computing infrastructure 130 may be a cloud infrastructure (such as Amazon Web Services (AWS) available from Amazon.com, Inc., Google Cloud Platform (GCP) available from Google LLC, etc.) that provides a virtual computing infrastructure for various customers, with the scale of such computing infrastructure being specified often on demand.

Alternatively, computing infrastructure 130 may correspond to an enterprise system (or a part thereof) on the premises of the customers (and accordingly referred to as "On-prem" infrastructure). Computing infrastructure 130 may also be a "hybrid" infrastructure containing some nodes of a cloud infrastructure and other nodes of an on-prem enterprise system.

All the nodes (160) of computing infrastructure 130 and performance manager 150 are connected via intranet 140. Internet 120 extends the connectivity of these (and other systems of the computing infrastructure) with external systems such as end-user systems 110. Each of intranet 140 and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranet 140. When the packet contains content such as port numbers, which specifies a target application, the packet may be said to be directed to such application as well.

Each of end-user systems 110 represents a system such as a personal computer, workstation, mobile device, computing tablet etc., used by users to generate (user) requests directed to software applications executing in computing infrastructure 130. A user request refers to a specific technical request (for example, Universal Resource Locator (URL) call) sent to a system in computing infrastructure 130 from an external system (here, end-user system) over Internet 120, typically in response to a user interaction at end-user systems 110. The user requests may be generated by users using appropriate user interfaces (e.g., web pages provided by an application executing in a node, a native user interface provided by a portion of an application downloaded from a node, etc.).

In general, an end-user system requests a software application for performing desired tasks and receives the corresponding responses (e.g., web pages) containing the results of performance of the requested tasks. The web pages/responses may then be presented to a user by a client application such as the browser. Each user request is sent in the form of an IP packet directed to the desired system or software application, with the IP packet including data identifying the desired tasks in the payload portion.

Some of nodes 160 may be implemented as corresponding data stores. Each data store represents a non-volatile (persistent) storage facilitating storage and retrieval of enterprise by software applications executing in the other systems/nodes of computing infrastructure 130. Each data store may be implemented as a corresponding database server using relational database technologies and accordingly provide storage and retrieval of data using structured queries such as SQL (Structured Query Language). Alternatively, each data store may be implemented as a corresponding file server providing storage and retrieval of data in the form of files organized as one or more directories, as is well known in the relevant arts.

Some of the nodes 160 may be implemented as corresponding server systems. Each server system represents a server, such as a web/application server, constituted of appropriate hardware executing software applications capable of performing tasks requested by end-user systems 110. A server system receives a user request from an end-user system and performs the tasks requested in the user request. A server system may use data stored internally (for example, in a non-volatile storage/hard disk within the server system), external data (e.g., maintained in a data store) and/or data received from external sources (e.g., received from a user) in performing the requested tasks. The server system then sends the result of performance of the tasks to the requesting end-user system (one of 110) as a corresponding response to the user request. The results may be accompanied by specific user interfaces (e.g., web pages) for displaying the results to a requesting user.

In one embodiment, software applications containing one or more components are deployed in nodes 160 of computing infrastructure 130. Examples of such software include, but are not limited to, data processing (e.g., batch processing, stream processing, extract-transform-load (ETL)) applications, Internet of things (IoT) services, mobile applications, and web applications. In the following description, the term "components" may refer to components of a single software application or multiple software applications. The components may also represent infrastructure components such as virtual machines (VMs), operating systems, etc. that form the basis for the deployment and execution of the software applications. It should be noted that some of the deployed components may be in a "executing" state where the software instructions are loaded into memory and being executed by processors in nodes 160, while some of the deployed components may be in a "ready for execution" state where the software instructions are merely loaded into memory.

It may be appreciated that each of nodes 160 has a fixed/limited number of resources such as memory (RAM), CPU (central processing unit) cycles, persistent storage, etc. that can be allocated to (and accordingly used by) software applications (or components thereof) executing in the node. Other resources that may also be provided associated with the computing infrastructure (but not specific to a node) include public IP (Internet Protocol) addresses, etc. In addition to such infrastructure resources, application resources such as database connections, application threads, etc. may also be allocated to (and accordingly used by) the software applications (or components thereof). Accordingly, it may be desirable to manage and forecast the resources required by the various software applications (and components thereof) executing in computing infrastructure 130.

Performance manager 150, providing according to several aspects of the present disclosure, facilitates the forecasting of resource requirements for components of software applications deployed in computing infrastructure 130. Though shown internal to computing infrastructure 130, in alternative embodiments, performance manager 150 may be implemented external to computing infrastructure 130, for example, as a system connected to Internet 120. The manner in which performance manager 150 facilitates such forecasting of resource requirements is described below with examples.

3. Forecasting Resource Requirements for Components

Figure 2:
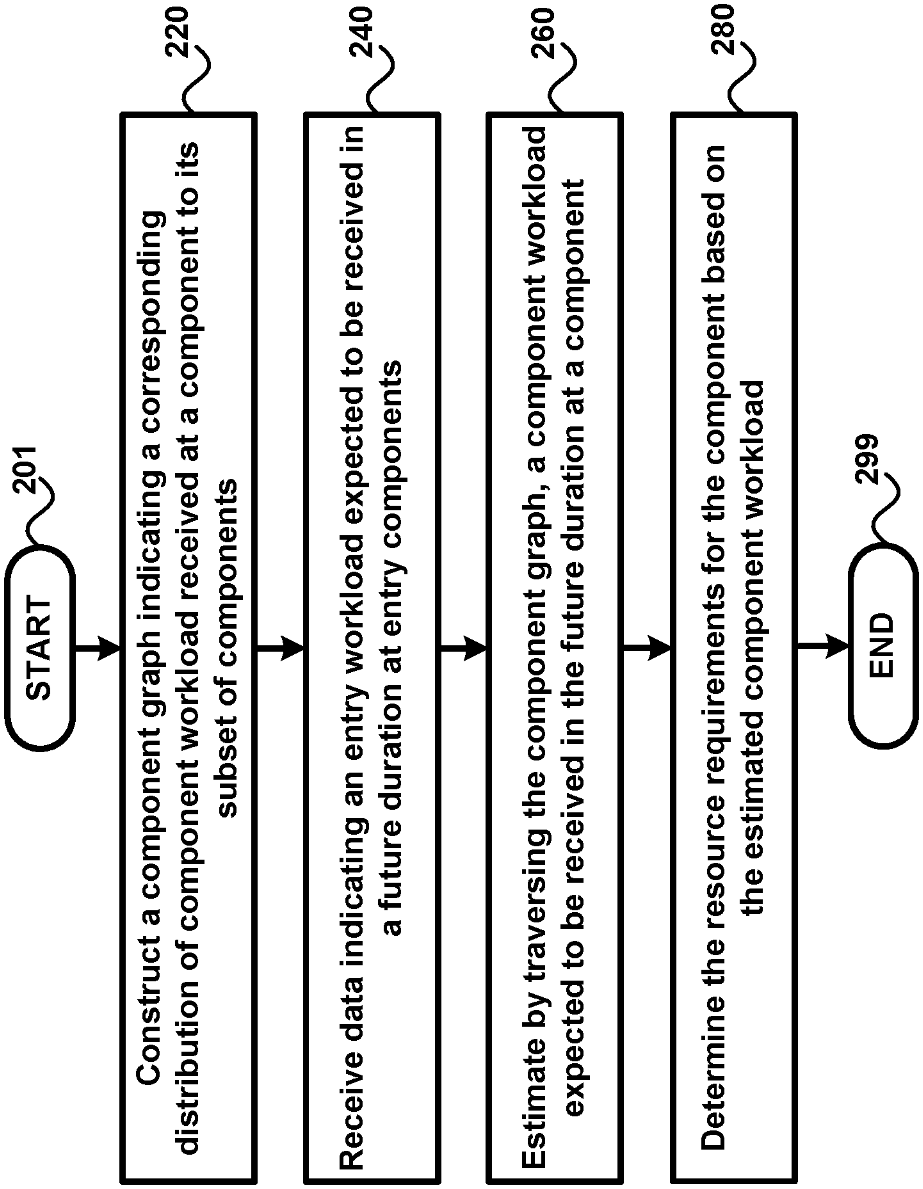
FIG. 2 is a flow chart illustrating the manner in which forecasting of resource requirements for components of software applications deployed in a computing infrastructure is facilitated according to several aspects of the present disclosure.

FIG. 2 is a flow chart illustrating the manner in which forecasting of resource requirements for components of software applications deployed in a computing infrastructure (130) is facilitated according to several aspects of the present disclosure. The flowchart is described with respect to the systems of FIG. 1, in particular performance manager 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 220.

In step 220, performance manager 150 constructs a component graph for the components deployed in computing infrastructure 130. The component graph indicates for each component, a corresponding subset of components that are invoked by the component and a corresponding distribution of component workload received at a component to its subset of components. The component graph may contain one or more entry components that directly receive (and are considered to be directly invoked by) user requests received from end-user systems 110, and one or more internal components that are in turn invoked by the entry components (or other internal components) during the processing of the received user requests.

A workload represents a set of user requests received from end-user systems 110 in a corresponding duration. According to an aspect, each workload contains transactions (user requests) of corresponding transaction types received in the corresponding duration, each workload indicating the corresponding transaction types and a respective number of occurrences (herein after referred to "transaction instances") of each transaction type in the corresponding duration.

The term "component workload" refers to the number and type of user requests received and processed by a component in a given duration, while the term "entry workload" refers to total number and types of requests received at the entry components in that given duration. It should be noted that the component workload will typically be proportional to (e.g. same as or less than) the entry workload.

According to an aspect, each edge in the component graph is associated with a corresponding branch probability of a component in the edge invoking another component in the edge, the branch probabilities associated with the edges between a component and its subset of components representing the corresponding distribution. In one embodiment, for each transaction type, a branch probability between a component and an invoked component (in the subset of components) is a ratio of number of the invocations of the invoked component to the total number of invocations of the component for processing the transactions instances of the transaction type.

In step 240, performance manager 150 receives data indicating an entry workload expected to be received in a future duration at one or more entry components (of the software applications). The data may be provided by an administrator of computing infrastructure 130 using one of end-user systems 110. The term "future duration" used herein refers to any duration after the time instance at which the data is provided/received.

In step 260, performance manager 150 estimates by traversing the component graph, a component workload, corresponding to the entry workload, expected to be received in the future duration at a specific component. In other words, performance manager 150 estimates the proportion of the expected entry workload that will be received by the specific component in the future duration.

According to an aspect, performance manager 150 estimates the component workload by first identifying, by traversing the component graph, a set of paths connecting the one or more entry components to the specific component in the component graph, each path of the set of paths containing a respective set of edges. Performance manager 150 then computes the component workload for the specific component based on the expected entry workload and a respective set of branch probabilities associated with the identified respective set of edges.

It may be appreciated that each identified path may correspond to a respective transaction type. As such, for a single path corresponding to a transaction type, the number of transaction instances of the transaction type as specified in the expected future workload may be multiplied by the set of branch probabilities associated with the set of edges in the single path to determine the number of transaction instances expected to be received at the specific component.

In step 280, performance manager 150 determines the resource requirements for the specific component based on the estimated component workload. The determination of the resource requirements may be performed in a known way, for example, using a rule-based system that correlates the component workload to the resource requirements.

According to an aspect, the determination is performed based on a capacity forecasting (CF) model generated for the specific component that correlates the values of resource usage metrics (measuring corresponding resources such as CPU, memory, storage used by the specific component in prior durations) to the corresponding component workloads received in the prior durations. Performance manager 150 predicts, using the CF model, a set of values for the resource usage metrics based on the estimated component workload in the future duration, the set of values representing the resource requirements of resources for the specific component in the future duration. Control passes to step 299, where the flowchart ends.

Thus, performance manager 150 facilitates forecasting of the resource requirements of a specific component deployed in computing infrastructure 130. Steps 260 and 280 may be iteratively performed for each of the components deployed in computing infrastructure 130, thereby facilitating the forecasting of resource requirements for components of software applications deployed in computing infrastructure 130. The manner in which performance manager 150 provides several aspects of the present disclosure according to the steps of FIG. 2 is illustrated below with examples.

4. Illustrative Example

FIGS. 3A-3B, 4, 5, 6A-6D, 7A-7B and 8A-8C illustrate the manner in which forecasting of resource requirements for components of software applications deployed in computing infrastructure 130 is facilitated in one embodiment. Each of the Figures is described in detail below.

Figure 3A:
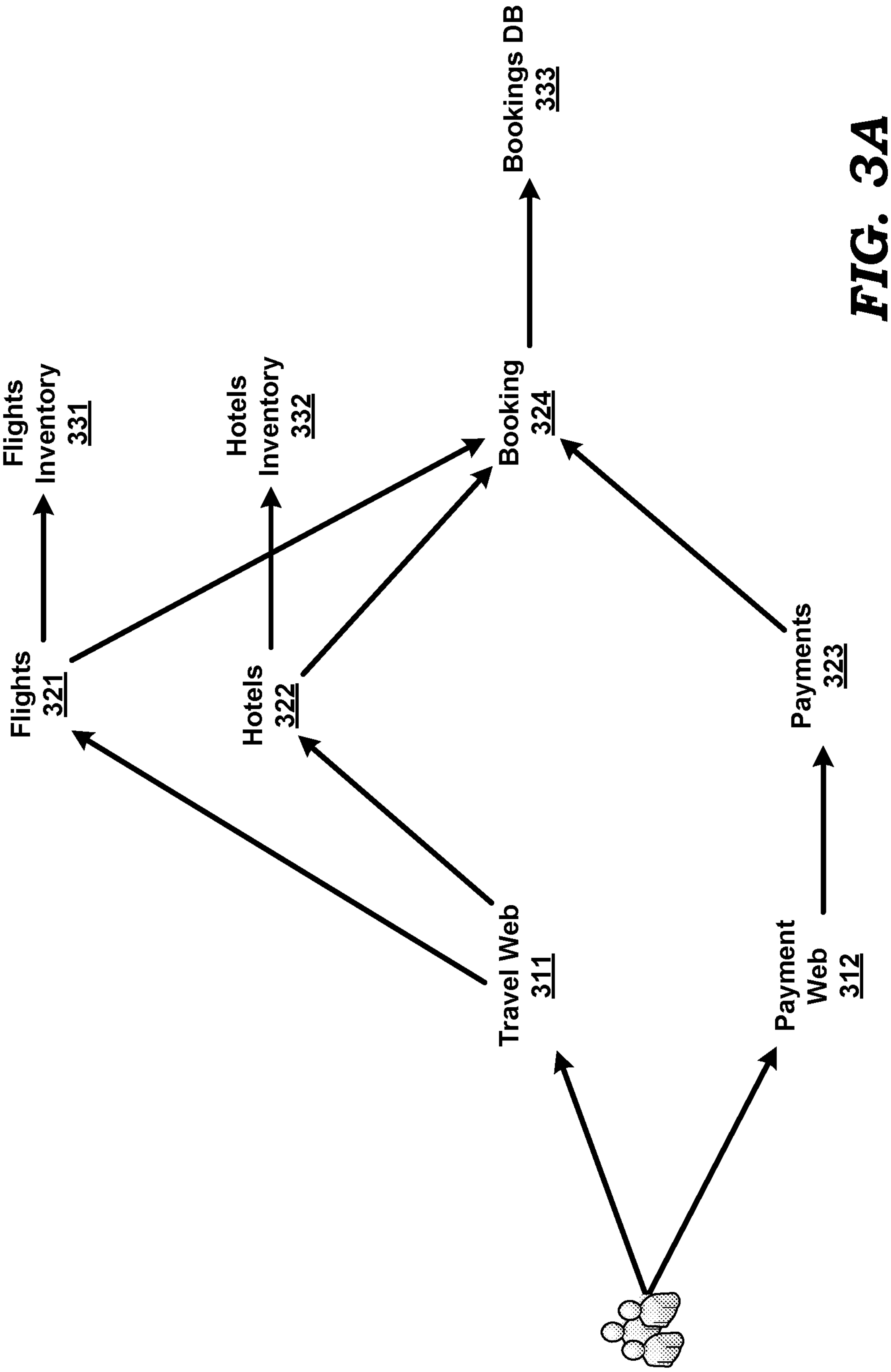
FIG. 3A depicts the details of a software application in one embodiment.

FIG. 3A depicts the details of a software application in one embodiment. For illustration, the software application is assumed to be an online travel application that enables users to search and book both flights and hotels. The online travel application is shown containing various components such as front-ends 311-312 (travel web and payment web respectively), backend services 321-324 (flights, hotels, payments and booking respectively) and data stores 331-333 (flights inventory, hotels inventory and bookings DB respectively).

Each of front-ends 311 and 312 is designed to process user requests received from external systems (such as end-user systems 110) connected to Internet 120 and send corresponding responses to the requests. For example, Travel Web 311 may receive (via path 121) user requests from a user using end-user system 110-2, process the received user requests by invoking one or more backend services (such as 321-323), and then send results of processing as corresponding responses to end-user systems 110-2. The responses may include appropriate user interfaces for display in the requesting end-user system (110-2). Payment Web 312 may similarly interact with end-user system 110-2 (or other end-user systems) and facilitate the user to make online payments.

Each of backend services 321-324 implements corresponding functionalities of the software application. Example of backend services are Flights service 331 providing the functionality of search of flights, Hotels service 322 providing the functionality of search of hotels, etc. A backend service (e.g., Flights service 321) may access/invoke other backend services (e.g. Booking service 324) and/or data stores (e.g. Flights Inventory 331) for providing the corresponding functionality.

Each of data stores 331-333 represents a storage component that maintains data used by other components (e.g., services, front-ends) of the software application. As noted above, each of the data stores may be implemented as a database server or file system based on the implementation of the software application.

The manner in which the various components of the software application (online travel application) are deployed in a computing infrastructure (130) is described below with examples.

Figure 3B:
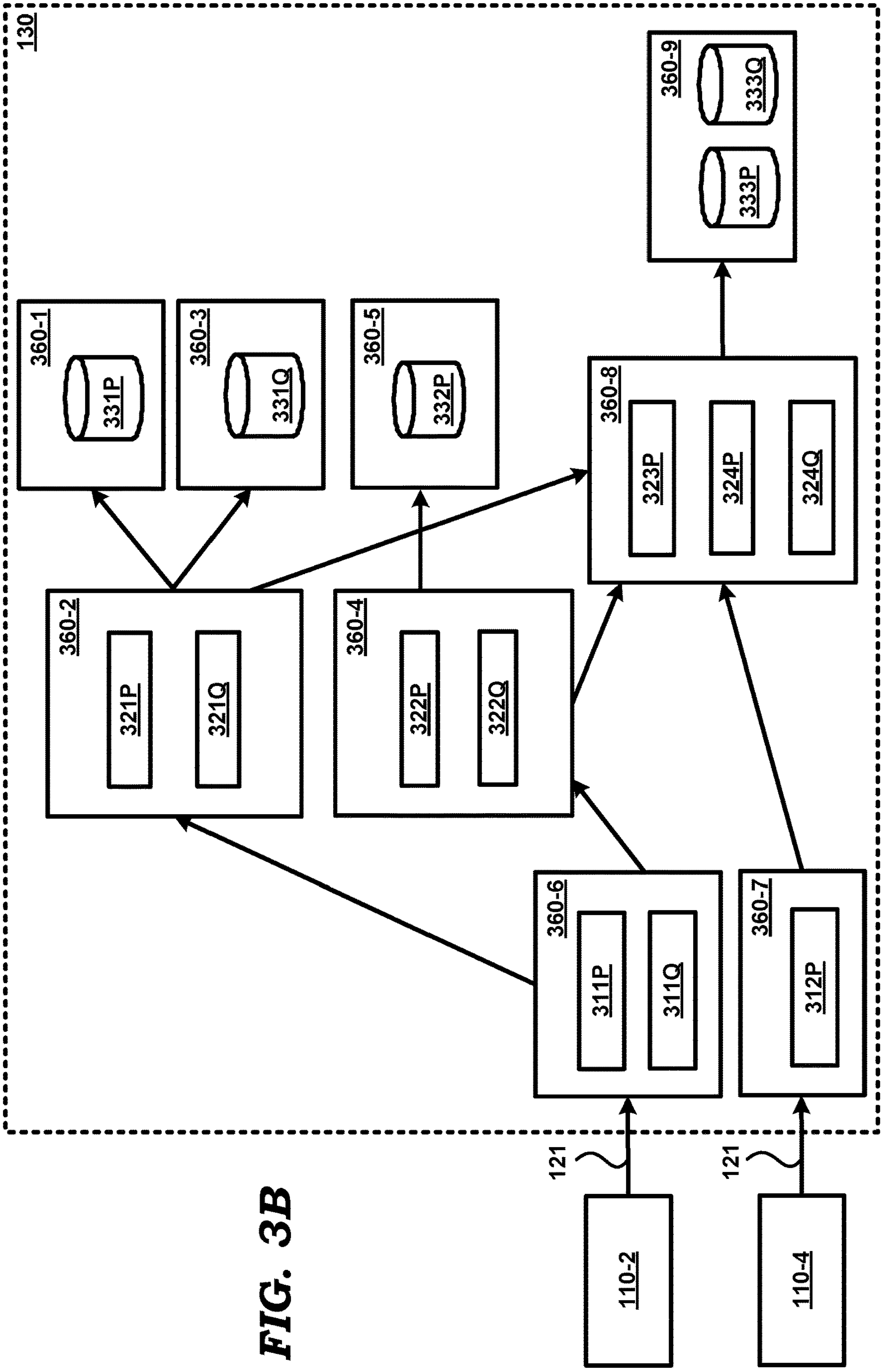
FIG. 3B depicts the manner in which a software application is deployed in a computing infrastructure in one embodiment.

FIG. 3B depicts the manner in which a software application is deployed in a computing infrastructure in one embodiment. In particular, the Figure depicts the manner in which the online travel application shown in FIG. 3A is deployed in computing infrastructure 130.

In one embodiment, virtual machines (VMs) form the basis for executing various software applications (or components thereof) in processing nodes/server systems of computing infrastructure 130. As is well known, a virtual machine may be viewed as a container in which software applications (or components thereof) are executed. A processing node/server system can host multiple virtual machines, and the virtual machines provide a view of a complete machine (computer system) to the applications/components executing in the virtual machine.

VMs 360-1 to 360-9 represent virtual machines provisioned on nodes 160 of computing infrastructure 130. Each of the VM is shown executing one or more instances (indicated by the suffix P, Q, R, etc.) of web portals 311-312 (implementing front-ends 311-312), application services 321-324 (implementing backend services 321-324) and/or data access interfaces 331-333 (implementing data stores 331-333). Such multiple instances may be necessitated for load balancing, throughput performance, etc. as is well known in the relevant arts. For example, VM 350-6 is shown executing two instances 311P and 311Q of the "Travel Web" web portal.

Thus, a software application (online travel application) containing one or more components is deployed in nodes 160 of computing infrastructure 130. Similarly, other software applications and components thereof may be deployed in nodes 160 of computing infrastructure 130. The manner in which performance manager 150 constructs a component graph indicating the invocation of the components of the software application is described below with examples.

5. Component Graph

Figure 4:
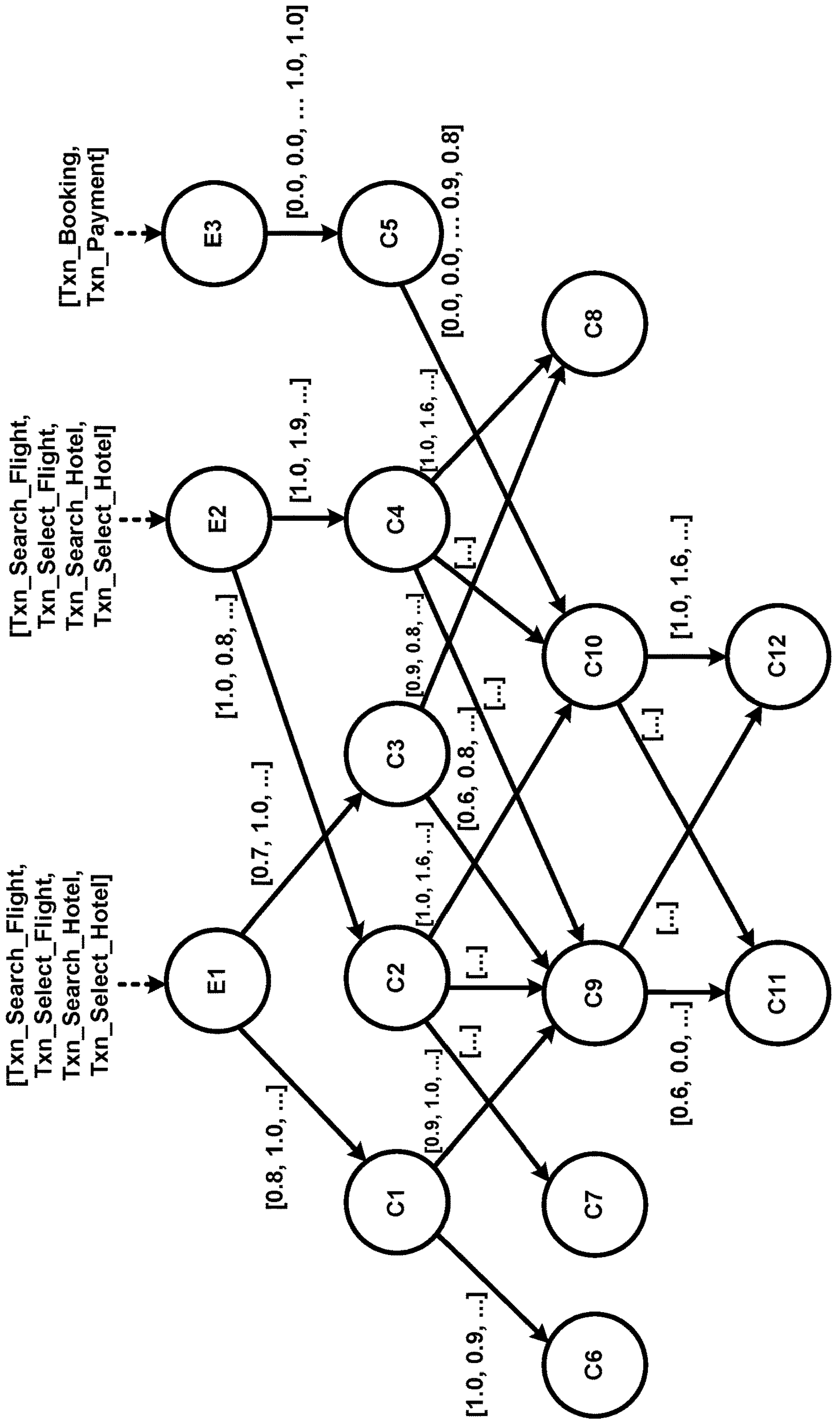
FIG. 4 illustrates a component graph indicating the invocation of components deployed in a computing infrastructure in one embodiment.

FIG. 4 illustrates a component graph indicating the invocation of components deployed in a computing infrastructure in one embodiment. Component graph 400 illustrates the invocation of components of online travel application deployed in computing infrastructure 130. In particular, components E1-E3 correspond to instances 311P-311Q and 312P of FIG. 3B, while components C1-C12 correspond to instances 321P-321Q, 322P-322Q, 323P, 331P-Q, 332P, 324P-324Q and 333P-333Q of FIG. 3B respectively.

E1, E2 and E3 represent entry components that directly receive (and are considered to be directly invoked by) user requests received from end-user systems 110. Each of entry components E1-E3 is shown receiving user requests of different transactions types such Txn_Search_Flight, Txn_Select_Flight, Txn_Booking, Txn_Payment, etc. Components C1-C12 represent internal components that are in turn invoked by the entry components E1-E3 (or other internal components) during the processing of the received user requests. Each edge of component graph 400 is shown associated with a list of values representing the branch probabilities associated with the edge for different transaction types noted above, though only some of the values are shown in the Figure for conciseness.

In one embodiment, performance manager 150 constructs component graph 400 by monitoring corresponding entry workloads received in one or more prior durations at the one or more entry components and processing each corresponding entry workload. As noted above, a workload represents a set of user requests received from end-user systems 110 in a corresponding duration.

In one embodiment, the number of user requests are captured for different block durations of 1 minute each. It should be appreciated that the block duration can be of fixed or variable time span, even though the embodiments below are described with respect to a fixed time span (e.g., one minute). Similarly, block durations can be non-overlapping time spans (as in the embodiments described below) or overlapping (e.g., sliding window).

Figure 5:
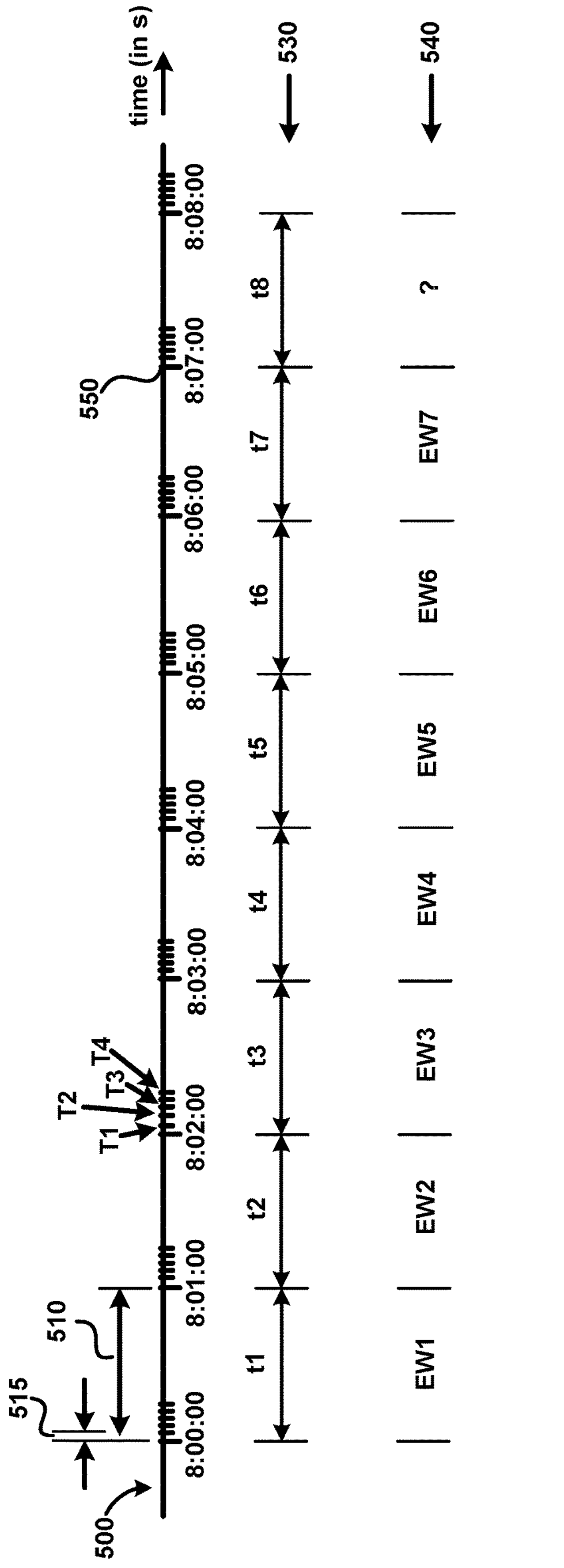
FIG. 5 depicts various timelines of operation of a software application in one embodiment.

FIG. 5 depicts various timelines of operation of a software application in one embodiment. Specifically, timeline 500 depicts the operation of a software application (e.g. online travel application) processing various user requests. For illustration, it is assumed that the user requests are received every second and accordingly timeline 500 is shown in seconds (as indicated by the 24-hour format "8:00:00"). As noted above, each user requests causes invocation of a corresponding entry component (such as E1-E3) of the software application.

Duration 515 represents the sub-block duration of one second, while duration 510 represents a block duration of one minute containing multiple (60) sub-block durations. Timeline 500 is shown having 8 block durations (t1 to t8) as indicated by 530. T1, T2, T3 and T4 indicate transactions instances (of corresponding transactions types) received by an entry component during the block duration t3. Similarly, other transaction instances are received during the other block durations.

EW1 to EW7 represent the workloads determined respectively for the block durations t1 to t7 as indicated by 540. As noted above, each workload indicates a corresponding number of occurrences of transaction types in the corresponding block duration. Thus, workload EW3 may be determined based on the count and type of the transaction instances T1, T2, T3, and T4 received in block duration t3.

At time instance 550 (8:07:00), performance manager 150 receives data indicating the entry workload (EW8) expected to be received in the future block duration t8. It may be appreciated that at time instance 550, block durations t1 to t7 represent a set of prior durations based on which component graph 400 may be constructed by performance manager 150. The manner in which performance manager 150 monitors entry workloads received in prior durations (t1 to t7) and constructs component graph 450 is described below with examples.

6. Constructing Component Graph

FIGS. 6A through 6D depicts sample data used in the construction of a component graph in one embodiment. Though shown in the form of tables, the sample data may be collected/maintained according to other data formats (such as extensible markup language (XML), etc.) and/or using other data structures (such as lists, trees, etc.), as will be apparent to one skilled in the relevant arts by reading the disclosure herein.

FIG. 6A is a real-time transaction table depicting metrics captured for various transactions that have occurred in a block duration during the operation of a software application, in one embodiment. In transaction table 610, the columns indicate the metrics captured, while the rows indicate the sub-blocks of one second in a block duration of one minute. Each cell thus indicates the value of metric captured for each sub-block in the block duration. It may be readily observed that for each transaction type (e.g. Txn_Search_Flight), multiple metrics (such as average response time in column Txn_Search_Flight_AvgRespTime and number of occurrences in column Txn_Search_Flight_Total) may be captured. The data of table 610 may be received by performance manager 150 from nodes 160.

FIG. 6B is an entry workload table depicting the entry workloads identified for a software application in one embodiment. In entry workload table 620, the columns indicate the different transaction types, while each row indicates a corresponding entry workload (EW1, EW2, EW3, etc.) for corresponding block duration. Each cell thus indicates a corresponding number of the transaction instances of the transaction type (indicated by the column) in the respective entry workload (indicated by the row). The data of table 620 may be determined by performance manager 150 by collating the data in table 610.

FIG. 6C is a component workload table depicting the component workloads identified for a component in one embodiment. Component workload table 630 is similar to entry workload table 620 and specifies the number of transactions instances of different transactions types received at a specific component (assumed to be C9, for illustration) in different block durations. CW1, CW2, etc. (rows in 630) represents the component workloads received at component C9 when the corresponding entry workloads EW1, EW2, etc. are received at the entry components (corresponding rows in table 620).

Each cell in table 630 also shows in brackets (as tuples) the corresponding invocation count of each of the invoked components (C11, C12). For example, for component workload CW3, the 155 transaction instances (of Txn_Search_Hotel transaction type) is shown with the tuple (45, 105) indicating that component C9 causes 45 and 105 invocations of components C11 and C12 for processing the 155 transaction instances. The data in table 630 may be determined by performance manager 150 based on the metrics shown in table 610 received from nodes 160 or may be provided directly (for example, the number of invocations of each invoked component) by nodes 160 to performance manager 150.

Performance manager 150, for each of the entry workloads EW1, EW2, etc., in table 620 first identifies an affected set of components invoked for processing the corresponding entry workload. For example, for the entry workload EW3, performance manager 150 may identify the set of affect components to be {E2, E3, C2, C4, C9, C10, C11, C12}. Performance manager 150 then determining a respective branch probability of each affected component to invoke each of a corresponding subset of affected components. It should be noted that the branch probabilities are determined based on the corresponding component workloads CW1, CW2, etc.

In one embodiment, for each transaction type, a branch probability between a component and an invoked component (in the subset of components) is determined as a ratio of number of the invocations of the invoked component to the total number of invocations of the component for processing the transactions instances of the transaction type. As such, for Txn_Search_Hotel transaction type, after processing entry workload EW3, performance manager 150 may determine the branch probability of the edge C9→C10 as 45/155 (from the values for CW3)=0.29 (indicating that 29% of the incoming transaction instances at C9 causes invocation of C10). The branch probabilities of different edges may be similarly found.

Performance manager 150 then annotates (adds or updates) respective edges in the component graph between the affected component and the corresponding subset of affected components to the respective branch probability. In one embodiment, performance manager 150 maintains a branch probability table associated with component graph 400.

FIG. 6D depicts a branch probability table annotated based on processing of different entry workloads in one embodiment. Specifically, branch probability tables 670 and 680 depicts the branch probabilities determined based on processing of entry workloads EW3 and EW7. In each table, the columns indicate the different transaction types, while each row indicates a corresponding edge in component graph 400. Each cell indicates a branch probability of a component in the edge invoking the other component in the edge for the corresponding transaction type (indicated by the column). The data of tables 670 and 680 may be determined and updated by performance manager 150. It should be noted that table 680 represents the most recent branch probability table based on processing of the most recent entry workload EW7 at time instance 550.

Thus, performance manager 150 constructs a component graph (400) and associated branch probability table indicating a corresponding distribution of component workloads received at the component to its subset of components. The manner in which resource requirements are forecasted for a future duration is described below with examples.

7. Estimating Component Workload

Referring again to FIG. 5, upon receiving at time instance 550, performance manager 150 receives data indicating the entry workload (EW8) expected to be received in the future block duration t8, performance manager 150 first estimates the component workload at a specific component (such as C9) corresponding to the expected entry load EW8.

In one embodiment, performance manager 150 first identifies, by traversing component graph 400, a set of paths connecting the one or more entry components to the specific component in the component graph, each path of the set of paths containing a respective set of edges. For example, for EW8 where there are transactions of all types, performance manager 150 may identify the set of paths to be {E1→C1→C9, E1→C3→C9, E2→C2→C9, E2→C4→C9} with each arrow (→) indicating the sequence/order of invocation of the components.

Each identified path may correspond to a respective transaction type. As such, for a single path (e.g., E1→C1→C9) corresponding to a transaction type (Txn_Search_Hotel), the number of transaction instances of the transaction type as specified in the expected future workload (e.g. 2000) may be multiplied by the set of branch probabilities (in table 680) associated with the set of edges in the single path to determine the number of transaction instances expected to be received at the specific component.

Similarly, the values for each of the transaction types may be determined, and the set of values for all of the transaction types is determined to be the estimated component workload at the specific component (C9) in the future duration (t8).

Broadly, it may be appreciated that the number of transaction instances for different transaction types may increase at different rates. For example, assuming there are only 2 types of transactions under consideration viz. T1 and T2. It is further assumed that T1 results in an increase of 20% traffic along E1→C1 and T2 results in 20% increment along E2→C4 in component graph 400. It must be noted that the increment in E1→C1 will be passed on to the forked branches C1→C6 and C1→C9. It may be noted that by estimating the effect of individual transactions on the entry component edges, the changes along each edge in the component graph can be estimated. However, the changes may not be uniform along each edge and will depend on the branch probability/ratio. That is if the branch ratio at any component (s1) to two of its invoked components (s2 and s3) is x:y and the change in the incoming number of transactions is z % then the increment along s1→s3 and s1→s2 will be z*(x/x+y) and z*(y/x+y) respectively.

Such an approach may be specifically desirable for micro-service based software applications. In such a scenario, there is a need to understand the branching probability between the components in order to understand the flow and division of traffic (user requests). Prior approaches assume that the workload variables for all components will increase proportionally. On the other hand, the instant disclosure uses topology information (component graph 400) to estimate the component workload. It may be appreciated that increase in traffic at the entry component may have no impact on one of the internal components or may have a 2× impact on another internal components—all of this is considered in traffic volume forecasting.

After estimating the component workload (expected in a future duration), performance manager 150 determines the resource requirements of the specific component (C9) based on the estimated component workload. The manner in which performance manager 150 determines the resource requirements is described below with examples.

8. Determining Resource Requirements

According to an aspect, the determination is performed based on a capacity forecasting (CF) model generated for the specific component that correlates the values of resource usage metrics (measuring corresponding resources such as CPU, memory, storage used by the specific component in prior durations) to the corresponding component workloads received in the prior durations. Performance manager 150 predicts, using the CF model, a set of values for the resource usage metrics based on the estimated component workload in the future duration, the set of values representing the resource requirements of resources for the specific component in the future duration. An example implementation of such a performance manager 150 is described in detail below.

Figure 7A:
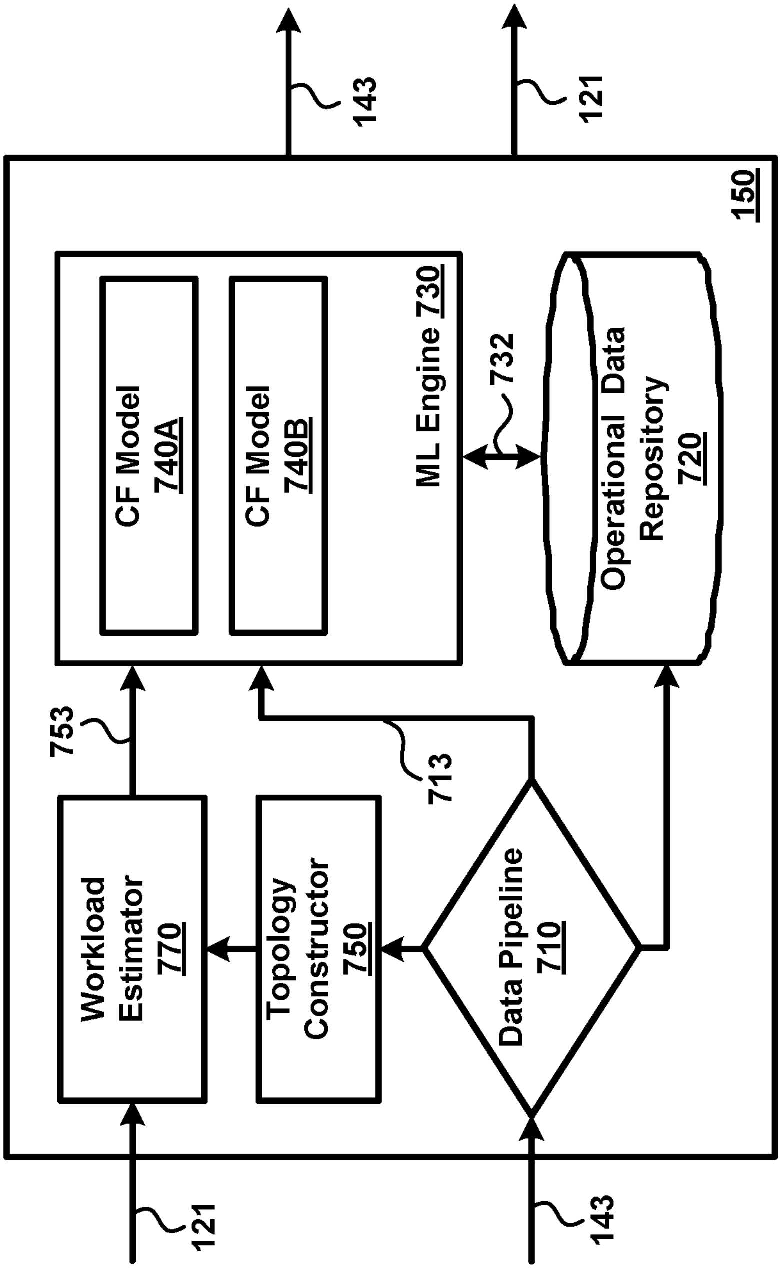
FIG. 7A is a block diagram depicting an implementation of a performance manager in one embodiment.

FIG. 7A is a block diagram depicting an implementation of a performance manager (150) in one embodiment. The block diagram is shown containing data pipeline 710, operational data repository (ODR) 720 and ML engine 730 (in turn, shown containing capacity forecasting models 740A and 740B), topology constructor 750 and workload estimator 770. Each of the blocks is described in detail below.

Data pipeline 710 receives (via path 143) from nodes 160 of cloud infrastructure 130, the details of user requests processed by components of software applications and the corresponding resources used by the components while processing user requests. As noted above, the resources may be hardware/infrastructure resources such as CPU, memory, disk storage, file system, cache, etc. or application resources such as database connections, database cursors, threads, etc.

FIG. 7B is a resource table depicting the usage of the resources by components of a software application deployed in a computing infrastructure in one embodiment. In particular, resource table 780 depicts the resource usage metrics for the component C9 in component graph 400 (corresponding to “Booking” instance of the online travel application depicted in FIGS. 3A-3B deployed in nodes 160 of computing infrastructure 130).

In resource table 780, the columns indicate the resources such as “CPU_UTIL”, “MEMORY”, etc., while the rows indicate the block durations of one minute each. Each cell (at the intersection of a row and a column) thus indicates the resource consumption metric for the corresponding resource in respective block duration. For example, resource table 810 indicates that the #(number) of DISK IO write operations performed by component 9 in the block duration “1/12/2016 0:05” (that is from “0:04” to “0:05”) is 153.8.

Similar tables may be generated/maintained for different components of the software application. In addition, the resource usage metrics for all components may be tallied to generate a resource table for the software application as a whole.

Referring again to FIG. 7A, data pipeline 710 stores the resource table (780) in ODR 720. ODR 720 represents a data store that maintains portions of resource usage data. Though shown internal to performance manager 150, in alternative embodiments, ODR 720 may be implemented external to performance manager 150, for example, in one or more of nodes 160. Data pipeline 710 also forwards the resource usage metrics data to ML engine 730 and topology constructor 750.

Topology constructor 750 receives the resource usage metrics data of table 780 along with the transaction data of table 610 and constructs a component graph (such as 400) as described in detail in the above sections. Topology constructor 750 forwards (or makes available) the constructed component graph to workload estimator 770.

ML engine 730 generates and maintains various models that correlate the resource data received from data pipeline 410 (referred to as “historical data”). The models may be generated using any machine learning (ML) approaches such as KNN (K Nearest Neighbor), Decision Tree, etc. or deep learning (DL) approaches such as Multilayer Perceptron (MLP), Convolutional Neural Networks (CNN), Long short-term memory networks (LSTM) etc. Various other machine/deep learning approaches can be employed, as will be apparent to skilled practitioners, by reading the disclosure provided herein. In an embodiment, supervised machine/deep learning approaches are used Each of capacity forecasting (CF) models 740A and 740B correlates the resource usage metrics of a corresponding component (e.g. C9) of software application to the corresponding component workloads received in the one or more prior block durations. It may be appreciated that in actual implementations, ML engine 730 may include multiple different models (similar to 740A/740B) corresponding to different components deployed in computing infrastructure 130. The models are thereafter used to predict the resource requirements of the components for future durations as described in detail below.

Workload estimator 770 receives (via path 121) data indicating an entry workload expected in a future duration, accesses a component graph (400) generated by topology generator 750 and estimates a component workload based on the entry workload and a set of branch probabilities determined by traversing the component graph, as explained in the above sections.

Workload estimator 770 forwards the estimated component workload to ML Engine 730, which selects the appropriate CF models 740A-740B corresponding to the component of interest (e.g. C9) and uses the selected CF model predict the resource requirements for the component (C9) for the future duration. The predicted resource requirements may be sent to nodes 160 (via path 143) or may be provided to a user/administrator using appropriate user interfaces (via path 121).

Thus, performance manager 150 is designed to process time series of values of various data types characterizing the operation of nodes 160 while processing user requests (transactions) received from end user systems 110. The data types can span a variety of data, for example, resource usage metrics (such as CPU utilization, memory used, storage used, etc.), logs, traces, topology, etc. Based on processing of such values of potentially multiple data types, performance manager 150 predicts expected values of resource usage metrics of interest for a future duration, which forms the basis for identifying potential capacity issues (shortage of resources, etc.) for components in computing infrastructure 130.

9. Handling Large Number of Transactions

It may be desirable that performance manager 150 be capable of forecasting/predicting capacity requirements for much larger number of transactions (user requests) than those available in historical data. For example, for a Black Friday sale where an e-commerce platform can anticipate up to 10× the normal traffic; or an airlines company expecting a spurt in ticket sales before the holiday travel season; or a bank looking forward to a significant increase in their net-banking usage because of aggressive marketing. These kinds of scenarios cannot be handled using current predict/probe techniques and requires careful planning and forecasting.

Figure 8A:
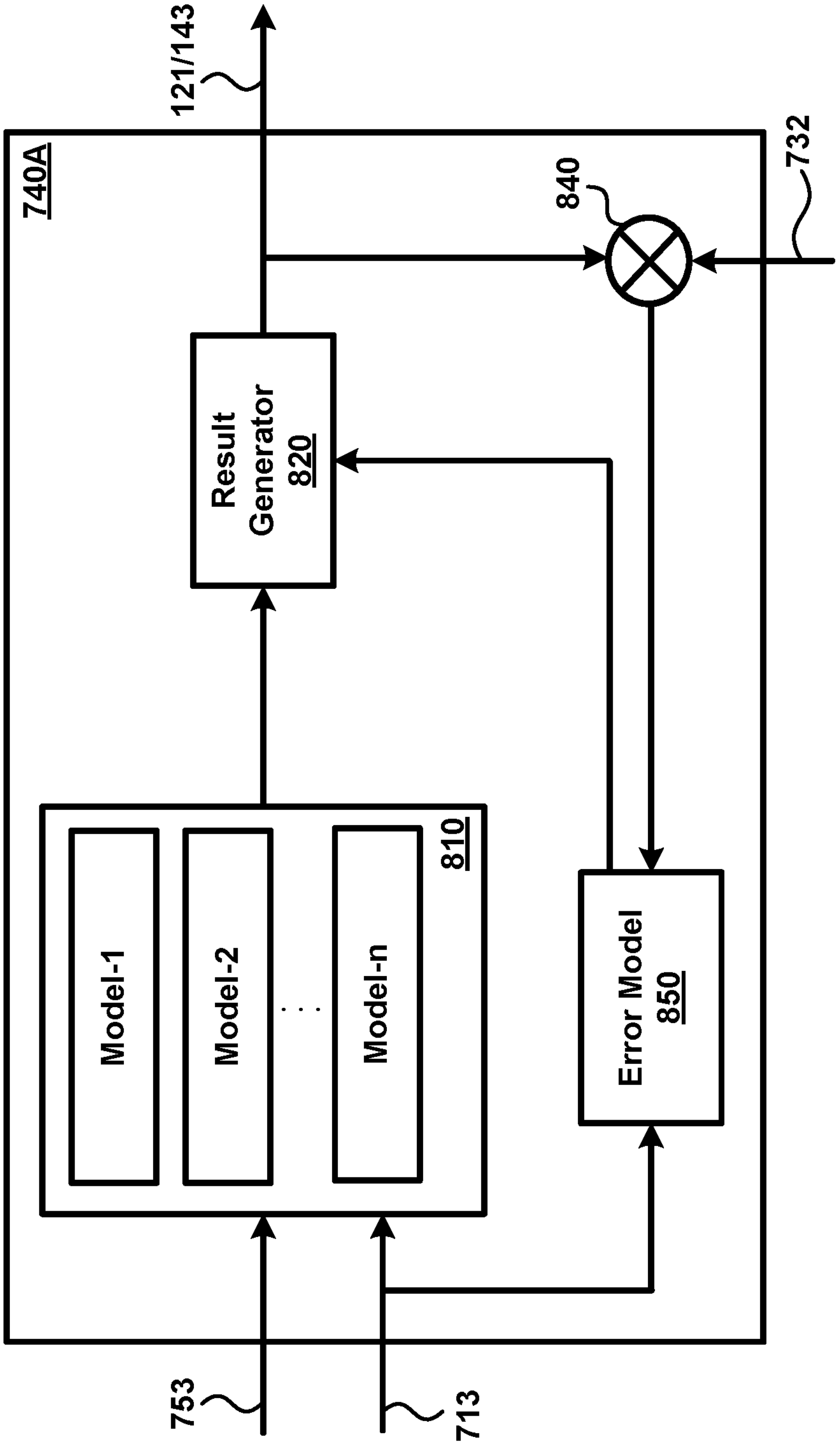
FIG. 8A is a block diagram depicting an implementation of a capacity forecasting (CF) model for handling large number of transactions in one embodiment.
Figure 8B:
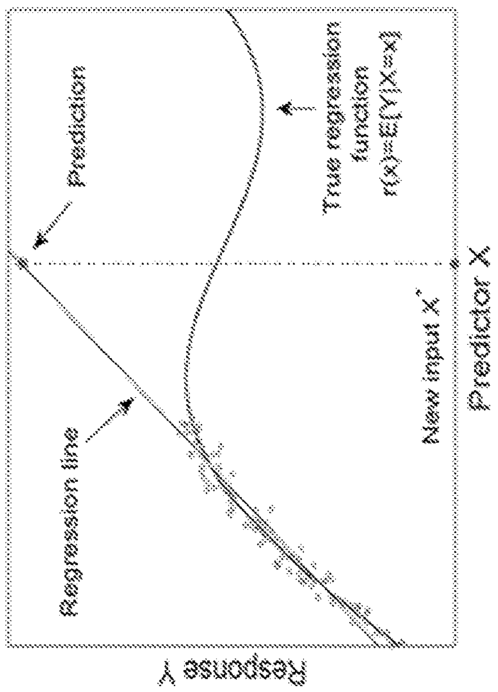
FIG. 8B graphically depicts the problem with long term time series forecasting in an embodiment.

FIG. 8B graphically depicts the problem with long term time series forecasting in an embodiment. As is well known, one problem with long term forecasting is that inferencing data is out-of-bounds from training/historical data. It is an extrapolation problem where the expected workloads will usually be larger values than the training data (component workloads in prior durations).

An aspect of the present disclosure is directed to a system and method to forecasting of resource requirements for much larger number of transactions than available in historical data. The manner in which performance manager 150 may be implemented to handle large number of transactions is described below with examples.

FIG. 8A is a block diagram depicting an implementation of a capacity forecasting (CF) model for handling large number of transactions in one embodiment. The block diagram of CF model 740A is shown containing models 810 (in turn shown containing Model-1, Model-2 . . . Model-n), result generator 820, comparator 840 and error model 850. Each of the blocks is described in detail below.

Models 810 represents an ensemble of various machine learning (ML) and deep learning (DL) based models (Model-1, Model-2, etc.) that corelates the resource usage metrics to the corresponding component workloads (input data set). The models may be generated using any of the ML and DL approaches noted above.

In one embodiment, as part of ML models, GAM (generative additive model) based and RERF based models are used while as part of DL models, LSTM based models are used. The usage of piecewise/GAM model is to make sure the most recent gradient is used for extrapolation. RERF is used as it captures non-linear relationships better than GAM. LSTM should be the ideal solution but some resource usage metrics may be more predictive and lies within a certain range without too much variation and as such LSTM may not be able to capture these relationships well.

Figure 8C:
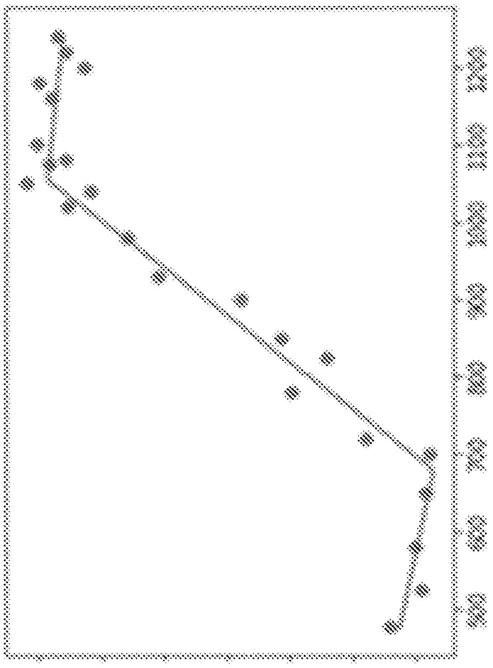
FIG. 8C illustrates a piece wise linear model used for predicting resource usage metrics in an embodiment.

FIG. 8C illustrates a piece wise linear model used for predicting resource usage metrics in an embodiment. Generalized Additive Models (GAM) typically use such piecewise linear regression models for better extrapolation. The model captures different linear trends in different regions of the data. The system fits a smooth function to represent Y:

$$g(E(Y))=\beta_0+f_1(x_1)+f_2(x_2)+ \dots +f_m(x_m)$$

With respect to the DL models, regression-enhanced random forests (RFs) are used. Such a non-parametric approach of RFs enables improvement over (normal) RFs with respect to extrapolation of data Referring again to FIG. 8A, the input data set (resource usage metrics and component workloads) is fed into each of the models (Model-1, Model-2, etc.) and the models learn in parallel. In other words, the weights of the models are trained based on the input data set according to the specific ML/DL approach implemented in each model. Each model then generates/predicts values (predicted values) for the resource usage metric for future time instances based on the training, as is well known in the relevant arts. The predicted values are forwarded to result generator 820.

Result generator 820 receives the predicted values for resource usage metrics from models 810 and determines a resultant predicted value for each resource usage metric. The resultant predicted value may be determined using any known technique such as taking an average of all the predicted values, taking the most occurring predicted value, etc. Result generator 820 then forwards the resultant predicted values of the resource usage metrics to nodes 160 (via path 143) or end-use systems 110 (via path 121).

According to an aspect of the present disclosure, CF model 740A implements a self-supervised learning approach. As the information on what happened after the first prediction is known, such information can be feed back into the system to improve the predictions. This feedback mechanism ensures that over time the system understands the seasonality and long-term trends.

In one embodiment, comparator 840 determines the errors (difference between the predicted values and actual values receive via path 732) for previously predicted resource requirement values and feeds the determined errors to error model 850. Error model 850 is DL model that is used to predict the errors in the resource requirements at future time instances. As such for a specific future first time instance, the ensemble of models 810 can be used to predict a first resource usage metric value, while error model is used to predict a first error in the predicted first resource usage metric value. Result generator 830 adds the predicted first resource usage metric value and the first error to provide the resource usage metric value forecasted for the workload that may need to be planned for at the future duration.

Such usage of a self-supervised model to understand seasonality and long-term trends is a key differentiator from prior approaches. The CF models are designed as ensemble models specifically keeping in mind that the model needs to extrapolate to values which is not seen in training/historical dataset. Simple mathematical models cannot do this effectively and the use of ensemble model based on a combination of linear, RF and LSTM based techniques is required to handle such extrapolation.

Thus, performance manager 150 can monitor the transactional data and predict the likely trends in the long term based on constraints. Performance manager 150 provides a robust time series forecasting algorithm with excellent extrapolation capabilities as the transaction data in the future may not lie in the same range as training data. Performance manager 150 also captures the true relationship between the transaction workloads and the behavior in coming up with the forecast which will minimize projection errors and reduce over or under projections. This forecast can be used to indicate future choke-points or bottlenecks in the system, reduce alerts over time and help SREs and ITOps in better resource planning.

It should be further appreciated that the features described above can be implemented in various embodiments as a desired combination of one or more of hardware, software, and firmware. The description is continued with respect to an embodiment in which various features are operative when the software instructions described above are executed.

10. Digital Processing System

Figure 9:
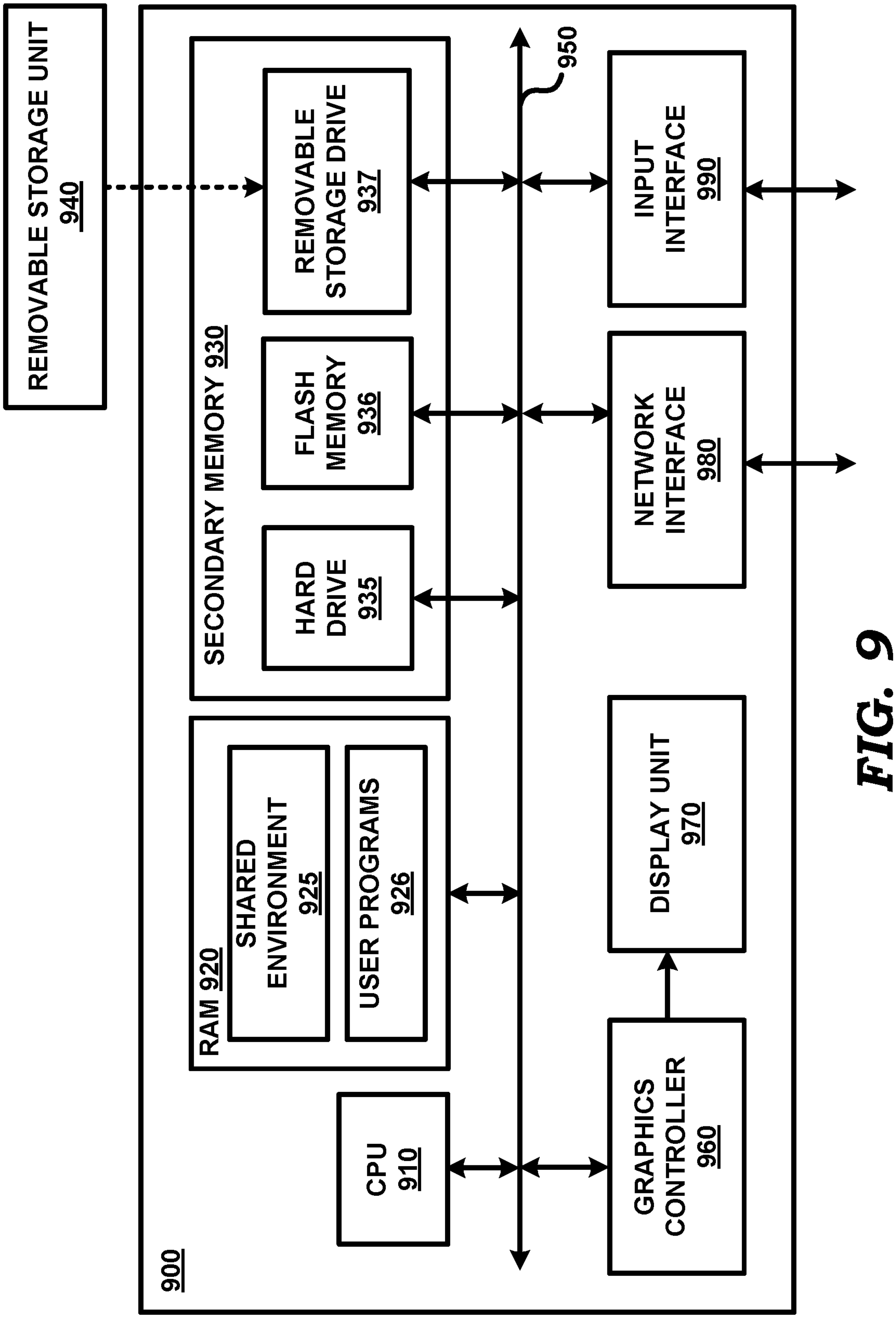
FIG. 9 is a block diagram illustrating the details of digital processing system in which various aspects of the present disclosure are operative by execution of appropriate executable modules.

FIG. 9 is a block diagram illustrating the details of digital processing system 900 in which various aspects of the present disclosure are operative by execution of appropriate executable modules. Digital processing system 900 may correspond to performance manager 150 (or any system implementing performance manager 150).

Digital processing system 900 may contain one or more processors such as a central processing unit (CPU) 910, random access memory (RAM) 920, secondary memory 930, graphics controller 960, display unit 970, network interface 980, and input interface 990. All the components except display unit 970 may communicate with each other over communication path 950, which may contain several buses as is well known in the relevant arts. The components of FIG. 9 are described below in further detail.

CPU 910 may execute instructions stored in RAM 920 to provide several features of the present disclosure. CPU 910 may contain multiple processing units, with each processing unit potentially being designed for a specific task. Alternatively, CPU 910 may contain only a single general-purpose processing unit.

RAM 920 may receive instructions from secondary memory 930 using communication path 950. RAM 920 is shown currently containing software instructions constituting shared environment 925 and/or other user programs 926 (such as other applications, DBMS, etc.). In addition to shared environment 925, RAM 920 may contain other software programs such as device drivers, virtual machines, etc., which provide a (common) run time environment for execution of other/user programs.

Graphics controller 960 generates display signals (e.g., in RGB format) to display unit 970 based on data/instructions received from CPU 910. Display unit 970 contains a display screen to display the images defined by the display signals. Input interface 990 may correspond to a keyboard and a pointing device (e.g., touch-pad, mouse) and may be used to provide inputs. Network interface 980 provides connectivity to a network (e.g., using Internet Protocol), and may be used to communicate with other systems connected to the networks.

Secondary memory 930 may contain hard drive 935, flash memory 936, and removable storage drive 937. Secondary memory 930 may store the data (e.g., portions of component graph of FIG. 4, the data of FIGS. 6A-6D and 7B) and software instructions (e.g., for performing the actions of FIG. 2, for implementing the blocks of FIGS. 3A-3B, 7A and 8A), which enable digital processing system 900 to provide several features in accordance with the present disclosure. The code/instructions stored in secondary memory 930 may either be copied to RAM 920 prior to execution by CPU 910 for higher execution speeds, or may be directly executed by CPU 910.

Some or all of the data and instructions may be provided on removable storage unit 940, and the data and instructions may be read and provided by removable storage drive 937 to CPU 910. Removable storage unit 940 may be implemented using medium and storage format compatible with removable storage drive 937 such that removable storage drive 937 can read the data and instructions. Thus, removable storage unit 940 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 940 or hard disk installed in hard drive 935. These computer program products are means for providing software to digital processing system 900. CPU 910 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 930. Volatile media includes dynamic memory, such as RAM 920. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 950. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

11. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A non-transitory machine-readable medium storing one or more sequences of instructions for forecasting resource requirements in a computing environment, wherein execution of said one or more instructions by one or more processors contained in a digital processing system cause said digital processing system to perform the actions of:

constructing a component graph of a plurality of components constituting a software application deployed in said computing environment, said plurality of components comprising a set of entry components and a set of internal components, only said set of entry components being designed to be invoked first upon receipt of user requests directed to said software application, and each of said set of internal components being designed to be thereafter invoked by one of said set of entry components and other ones of said set of internal components during processing of said user requests directed to said software application, wherein said component graph indicates for each component of said plurality of components, a corresponding subset of components that are invoked by said component, wherein said corresponding subset of components are comprised in said plurality of components, said component graph further indicates for each component, upon being invoked, a corresponding distribution of invocation probabilities among said corresponding subset of components of the component;

receiving data indicating an entry workload expected to be received by said software application in a future duration at said set of entry components, said entry workload comprising a set of user requests to said software application;

estimating by traversing said component graph, a first internal component workload, corresponding to said entry workload, expected to be received in said future duration at a first internal component of said set of internal components; and determining resource requirements for said first internal component based on said first internal component workload estimated for said first internal component.

2. The non-transitory machine-readable medium of claim 1, wherein each of said respective component workload and said entry workload comprises transactions of corresponding transaction types received in a corresponding duration, said first internal component workload indicating said corresponding transaction types and a respective number of occurrences of each transaction type in said corresponding duration.

3. The non-transitory machine-readable medium of claim 1, wherein each edge in said component graph is associated with a corresponding branch probability of a component in said edge invoking another component in said edge, the branch probabilities associated with the edges between said component and said subset of components representing said corresponding distribution of invocation probabilities, wherein said estimating comprises one or more actions of:

identifying, by traversing said component graph, a first set of paths connecting said one or more entry components to said first internal component in said component graph, each path of said first set of paths comprising a respective first set of edges; and computing said first internal component workload for said first internal component based on said entry workload expected in said future duration and a respective set of branch probabilities associated with said respective first set of edges.

4. The non-transitory machine-readable medium of claim 1, wherein said constructing comprises one or more actions of:

monitoring corresponding entry workloads received in one or more prior durations at said one or more entry components; and processing each corresponding entry workload for respective internal component of said set of internal components by:

identifying an affected set of components invoked in said plurality of components for processing said corresponding entry workload;

determining a respective branch probability of each affected component to invoke each of a corresponding subset of affected components; and annotating respective edges in said component graph between said affected component and said corresponding subset of affected components to said respective branch probability.

5. The non-transitory machine-readable medium of claim 1, wherein said determining comprises one or more actions of:

monitoring a first plurality of resource usage metrics associated with said first internal component while processing corresponding component workloads received in one or more prior durations at said first internal component, wherein each resource usage metric of said plurality of resource usage metrics measures a corresponding resource of a plurality of resource used by said first internal component;

generating a first capacity forecasting (CF) model for said first internal component that correlates the values of said first plurality of resource usage metrics to said corresponding component workloads received in said one or more prior durations; and predicting, using said first CF model, a first set of values for said first plurality of resource usage metrics based on said first internal component workload expected in said future duration, wherein said first set of values represent said resource requirements of said plurality of resources for said first internal component.

6. The non-transitory machine-readable medium of claim 5, wherein said first CF model comprises an ensemble of one or more machine learning (ML) models and one or more deep learning (DL) models.

7. The non-transitory machine-readable medium of claim 6, wherein said one or more ML models comprises a GAM (generative additive model) based model and a RERF (Regression-enhanced Random Forests) based model, wherein said one or more DL models comprises a LSTM (Long short-term memory) based model.

8. The non-transitory machine-readable medium of claim 7, wherein said first CF model is a self-supervised learning model.

9. A method for forecasting resource requirements in a computing environment, the method comprising:

constructing a component graph of a plurality of components constituting a software application deployed in said computing environment, said plurality of components comprising a set of entry components and a set of internal components, only said set of entry components being designed to be invoked first upon receipt of user requests directed to said software application, and each of said set of internal components being designed to be thereafter invoked by one of said set of entry components and other ones of said set of internal components during processing of said user requests directed to said software application, wherein said component graph indicates for each component of said plurality of components, a corresponding subset of components that are invoked by said component, wherein said corresponding subset of components are comprised in said plurality of components, said component graph further indicates for each component, upon being invoked, a corresponding distribution of invocation probabilities among said corresponding subset of components of the component;

receiving data indicating an entry workload expected to be received by said software application in a future duration at said set of entry components, said entry workload comprising a set of user requests to said software application;

estimating by traversing said component graph, a first internal component workload, corresponding to said entry workload, expected to be received in said future duration at a first internal component of said set of internal components; and determining resource requirements for said first internal component based on said first internal component workload estimated for said first internal component.

10. The method of claim 9, wherein each of said component workload and said respective entry workload comprises transactions of corresponding transaction types received in a corresponding duration, said first internal component workload indicating said corresponding transaction types and a respective number of occurrences of each transaction type in said corresponding duration.

11. The method of claim 9, wherein each edge in said component graph is associated with a corresponding branch probability of a component in said edge invoking another component in said edge, the branch probabilities associated with the edges between said component and said subset of components representing said corresponding distribution of invocation probabilities, wherein said estimating comprises:

identifying, by traversing said component graph, a first set of paths connecting said one or more entry components to said first internal component in said component graph, each path of said first set of paths comprising a respective first set of edges; and computing said first internal component workload for said first internal component based on said entry workload expected in said future duration and a respective set of branch probabilities associated with said respective first set of edges.

12. The method of claim 9, wherein said constructing comprises:

monitoring corresponding entry workloads received in one or more prior durations at said one or more entry components; and processing each corresponding entry workload for respective internal component of said set of internal components by:

identifying an affected set of components invoked in said plurality of components for processing said corresponding entry workload;

determining a respective branch probability of each affected component to invoke each of a corresponding subset of affected components; and annotating respective edges in said component graph between said affected component and said corresponding subset of affected components to said respective branch probability.

13. The method of claim 9, wherein said determining comprises:

monitoring a first plurality of resource usage metrics associated with said first internal component while processing corresponding component workloads received in one or more prior durations at said first internal component, wherein each resource usage metric of said plurality of resource usage metrics measures a corresponding resource of a plurality of resource used by said first internal component;

generating a first capacity forecasting (CF) model for said first internal component that correlates the values of said first plurality of resource usage metrics to said corresponding component workloads received in said one or more prior durations; and predicting, using said first CF model, a first set of values for said first plurality of resource usage metrics based on said first internal component workload expected in said future duration, wherein said first set of values represent said resource requirements of said plurality of resources for said first internal component.

14. The method of claim 13, wherein said first CF model comprises an ensemble of one or more machine learning (ML) models and one or more deep learning (DL) models, wherein said one or more ML models comprises a GAM (generative additive model) based model and a RERF (Regression-enhanced Random Forests) based model, wherein said one or more DL models comprises a LSTM (Long short-term memory) based model.

15. The method of claim 14, wherein said first CF model is a self-supervised learning model.

16. A digital processing system comprising:

a random access memory (RAM) to store instructions for forecasting resource requirements in a computing environment; and one or more processors to retrieve and execute the instructions, wherein execution of the instructions causes the digital processing system to perform the actions of:

constructing a component graph of a plurality of components constituting a software application deployed in said computing environment, said plurality of components comprising a set of entry components and a set of internal components, only said set of entry components being designed to be invoked first upon receipt of user requests directed to said software application, and each of said set of internal components being designed to be thereafter invoked by one of said set of entry components and other ones of said set of internal components during processing of said user requests directed to said software application, wherein said component graph indicates for each component of said plurality of components, a corresponding subset of components that are invoked by said component, wherein said corresponding subset of components are comprised in said plurality of components, said component graph further indicates for each component, upon being invoked, a corresponding distribution of invocation probabilities among said corresponding subset of components of the component;

receiving data indicating an entry workload expected to be received by said software application in a future duration at said set of entry components, said entry workload comprising a set of user requests to said software application;

estimating by traversing said component graph, a first internal component workload, corresponding to said entry workload, expected to be received in said future duration at a first internal component of said set of internal components; and determining resource requirements for said first internal component based on said first internal component workload estimated for said first internal component.

17. The digital processing system of claim 16, wherein each of said component workload and said respective entry workload comprises transactions of corresponding transaction types received in a corresponding duration, said first internal component workload indicating said corresponding transaction types and a respective number of occurrences of each transaction type in said corresponding duration.

18. The digital processing system of claim 16, wherein each edge in said component graph is associated with a corresponding branch probability of a component in said edge invoking another component in said edge, the branch probabilities associated with the edges between said component and said subset of components representing said corresponding distribution of invocation probabilities, wherein for said estimating, said digital processing system performs the actions of:

identifying, by traversing said component graph, a first set of paths connecting said one or more entry components to said first internal component in said component graph, each path of said first set of paths comprising a respective first set of edges; and computing said first internal component workload for said first internal component based on said entry workload expected in said future duration and a respective set of branch probabilities associated with said respective first set of edges.

19. The digital processing system of claim 16, wherein for said constructing, said digital processing system performs the actions of:

monitoring corresponding entry workloads received in one or more prior durations at said one or more entry components; and processing each corresponding entry workload for respective internal component of said set of internal components by:

identifying an affected set of components invoked in said plurality of components for processing said corresponding entry workload;

determining a respective branch probability of each affected component to invoke each of a corresponding subset of affected components; and annotating respective edges in said component graph between said affected component and said corresponding subset of affected components to said respective branch probability.

20. The digital processing system of claim 16, wherein for said determining, said digital processing system performs the actions of:

monitoring a first plurality of resource usage metrics associated with said first internal component while processing corresponding component workloads received in one or more prior durations at said first internal component, wherein each resource usage metric of said plurality of resource usage metrics measures a corresponding resource of a plurality of resource used by said first internal component;

generating a first capacity forecasting (CF) model for said first internal component that correlates the values of said first plurality of resource usage metrics to said corresponding component workloads received in said one or more prior durations; and predicting, using said first CF model, a first set of values for said first plurality of resource usage metrics based on said first internal component workload expected in said future duration, wherein said first set of values represent said resource requirements of said plurality of resources for said first internal component.

21. The digital processing system of claim 20, wherein said first CF model comprises an ensemble of one or more machine learning (ML) models and one or more deep learning (DL) models, wherein said one or more ML models comprises a GAM (generative additive model) based model and a RERF (Regression-enhanced Random Forests) based model, wherein said one or more DL models comprises a LSTM (Long short-term memory) based model.

22. The digital processing system of claim 21, wherein said first CF model is a self-supervised learning model.

* * * * *